June 25, 1929. W. KUNZE 1,718,422
DISTANCE MEASURING WITH THE AID OF SOUND WAVES
Filed Dec. 7, 1922  2 Sheets-Sheet 1

June 25, 1929.  W. KUNZE  1,718,422
DISTANCE MEASURING WITH THE AID OF SOUND WAVES
Filed Dec. 7. 1922  2 Sheets-Sheet 2

Patented June 25, 1929.

1,718,422

UNITED STATES PATENT OFFICE.

WILLY KUNZE, OF BREMEN, GERMANY, ASSIGNOR TO ATLAS-WERKE AKTIEN-GESELLSCHAFT, OF BREMEN, GERMANY.

DISTANCE MEASURING WITH THE AID OF SOUND WAVES.

Application filed December 7, 1922, Serial No. 605,538, and in Germany December 16, 1921.

Methods for measuring distances with the aid of sound waves are known. The object is to determine the time which the sound requires for travelling through the distance to be measured. If the speed of the sound is known the distance through which the same has travelled can be easily found by calculation. In this manner the distance of a reflecting surface can be specially well determined with the aid of the echo of the sound. The principal difficulty connected with these methods is the measuring of the short periods of time which are generally involved.

The character of the present invention consists in sharply limiting, by closing or interrupting one and the same or several circuits, the time period between the instant when the sound arrives at the beginning of the distance to be measured and when it arrives at the end of this distance, these closings and interruptions both together or each one of the same separately being produced directly or indirectly by the action of the sound waves. The first closing or interrupting can be directly produced simultaneously with the emission of the sound. It is thus easy to measure, from the action upon an electric indicating instrument depending on the time period between the closings of the circuit and the interruptions of the same, this time period and with the same the distance through which the sound has travelled.

Various combinations are possible for the closings and interruptions of the circuit. The first circuit-closing or -interruption can be effected for instance with electric sound transmitters by using the switch or contact maker which switches the transmitter in, for simultaneously switching in or out a measuring circuit. The arrangement could however be such that the first circuit-closing or the first circuit-interrupting is effected by the action of the sound, produced at any point, upon a receiving device arranged at the beginning of the distance to be measured. The closing or interrupting of the circuit at the end of the time period is produced in both cases by the action of the sound upon a receiving device arranged at the end of the distance to be measured.

If in this manner the beginning and end of the time period to be measured has been exactly determined the measuring of the time period itself can be effected in the most various manners, for instance by measuring the quantity of electricity which flows during this time period in the measuring circuit which is switched in or out. This can be done with the aid of a separate galvanometer or of a condenser chronograph, not a simple circuit, but a kind of bridge connection being preferably used. It is further advisable not to use any circuit-closings but only circuit-interruptions. The novelty according to the invention consists in the idea to produce by the actions of the sound both or one of the circuit-closings or of the circuit-interruptions of such a measuring circuit at the instants when the sound arrives at the beginning and at the end of the distance to be measured.

In the methods which have been previously described a single measuring was supposed to be used, or a single emission of sound and a single fixing of the two instants when the sound arrives at the beginning and at the end of the distance to be measured. Such single measurements can evidently be made also successively as often as required.

It is however also possible to obtain a continuous indication of the actual distance by emitting the sound in regular known intervals whereby the circuit-closings and -interruptions are produced in regular succession. In the measuring circuit regularly succeeding current impulses or intervals will occur in which no current flows through the circuit, the duration of these impulses or intervals being dependent on the time which the sound requires for travelling through the distance to be measured. In this case the relation of the time periods during which current flows in the measuring circuit or not is of importance. If an electric measuring instrument, for instance an amperemeter, voltmeter, wattmeter or the like, is inserted in the measuring circuit which contains a source of current, this meter will indicate a determined average value of the current, of the voltage or of the like. This can be easily effected by a corresponding rapid succession of the sound emissions. These indicating instruments can be directly inserted in the circuit which is closed and interrupted or it can be coupled with the same in any convenient manner, for instance inductively. The scale is gauged preferably in time units or in distance units. The intervals between the several sound impulses can be preferably chosen smaller for short distances than for long distances to be measured.

If the distance of a reflecting surface from a determined point has to be measured, for instance the depth of the sea from a ship, the action of the sound echo upon a receiving device is utilized for the switching-in or cutting out of the measuring circuit. The first circuit-closing or the first circuit-interruption can be again effected simultaneously with the emission of sound, or with the switching-in of the transmitter or by the action of the direct sound upon a receiver. The second circuit-closing or -interruption is effected in this case always by the action of the echo upon a receiver protected against the direct sound. With this object in view two receivers, which are protected against the action of the direct sound, are arranged at a known distance the one from the other and the time between the arrival of the echo at these two receivers is measured. The distance of the reflecting surfaces can thus be easily ascertained if the distance of the sound transmitter from the receiver is also known.

In the accompanying drawings devices for the execution of the method are diagrammatically shown.

Figure 1:
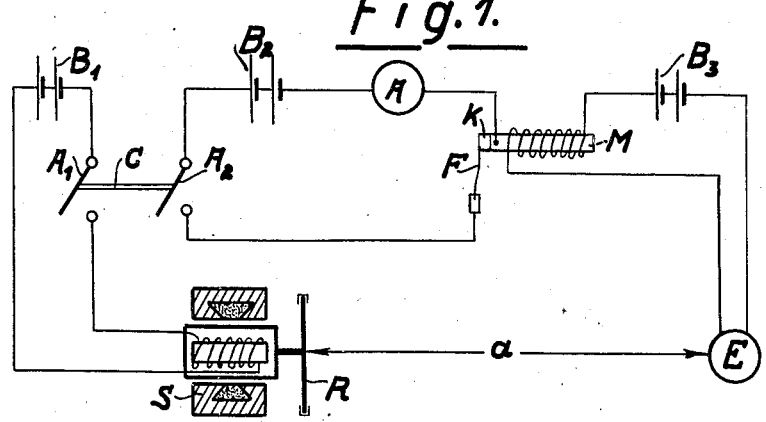
Fig. 1 shows a device in which the switching-in of the measuring circuit takes place simultaneously with the switching-in of the sound transmitter.

In the device shown in Fig. 1, S is a sound transmitter with the sound plate R. It is fed from the battery $B_1$ when the switch $A_1$ is closed and it emits a sound impulse which traverses the distance $a$ to be measured and excites the receiver E. Through the intermediary of C a switch $A_2$ is positively connected with the switch $A_1$ to close a measuring circuit with the battery $B_2$ and the indicating instrument A. This measuring circuit comprises a contact K upon a spring F which is held closed through the intermediary of the electro-magnet M until the sound impulse arrives at the receiver E fed from the battery $B_3$. At this instant the working current of this receiver (microphone) is momentarily weakened so that the spring F is released and the contact K opens the circuit. The instrument A has therefore been exposed to the action of the current only during the time between emission of sound and arrival of the sound at E, viz, for the time which the sound has used for travelling through the distance $a$. According to the length of $a$ this time varies and the values which A (for instance a current meter) indicates are a measure for the length $a$. The time during which the relay acts is the same for all measurings and it can be considered at the calibrating of the instrument.

Figure 2:
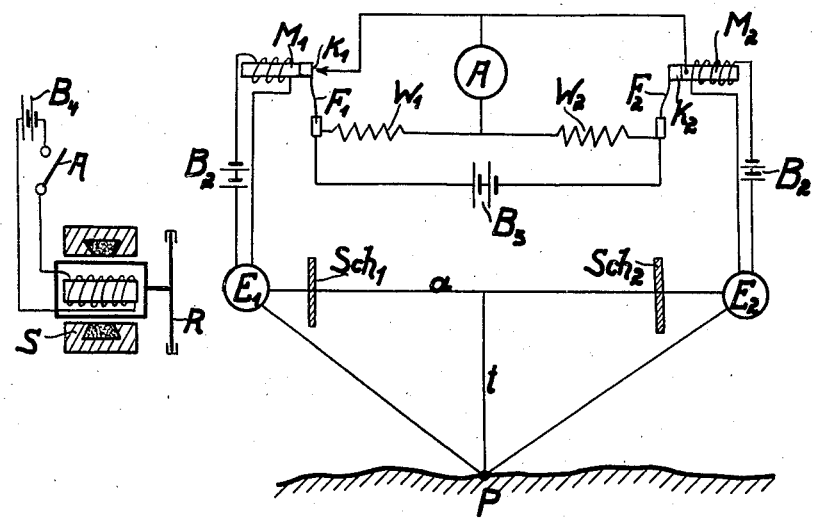
Fig. 2 shows a device for measuring a distance by means of the sound echo, both circuit-closings or -interruptions being effected by actions of the sound upon the receiver.

In Fig. 2 the transmitting device is the same as that in Fig. 1. The distance $t$ of point P from the line $E_1$—$E_2=a$ has to be ascertained. The measuring instrument A, for instance a galvanometer, is in a bridge connection and it is currentless at the beginning of the measuring when both contacts $K_1$ and $K_2$ are closed. When the current impulse arrives at $E_1$ the attracting power of the permanent magnet is increased and the contact $K_1$ is opened. The bridge is now no longer in equilibrium but a current flows from the battery $B_3$, across the resistance $W_1$, through A. At the instant when the echo from P arrives at $E_2$ the contact $K_2$ is opened from the magnet $M_2$ and the instrument A is again currentless. In A a current has therefore flown during the time which the sound has required to traverse the distance $E_1$—P to $E_2$. It has been supposed that the transmitter is arranged in proximity of $E_1$. From the time to be found out by the action of the current upon A the distance $t$ can be easily calculated if $a$ is known. $Sch_1$ and $Sch_2$ are two sound screens designed to prevent the direct sound from acting upon $E_2$.

Figure 3:
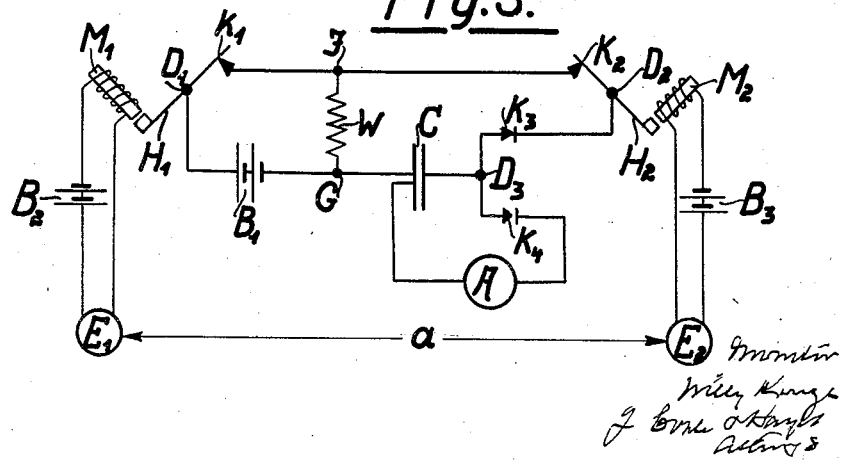
Fig. 3 shows a similar device in which the time is measured by the charging or discharging of a condenser.

In the device shown in Fig. 3 the transmitter has to be imagined as being at the left of $E_1$.

The operation is as follows:—At the instant when the sound arrives at $E_1$ the magnet $M_1$ is weakened and releases the lever $H_1$ which pivots around $D_1$. The contact $K_1$ is therefore opened. As long as this contact had been closed a potential difference existed at the points G and J of the resistance W up to which the condenser C has been charged. At the opening of the contact $K_1$ this potential difference disappears and the condenser discharges across G J $K_2$ $D_2$ $K_3$ $D_3$ until the sound arrives at $E_2$ and effects the opening of contact $K_2$. By depression of the contact $K_4$ the instrument A can be laid on the condenser and the charge before and after the measuring can be determined. The difference is a measure for the time during which the sound has travelled or for the distance $a$.

Figure 4:
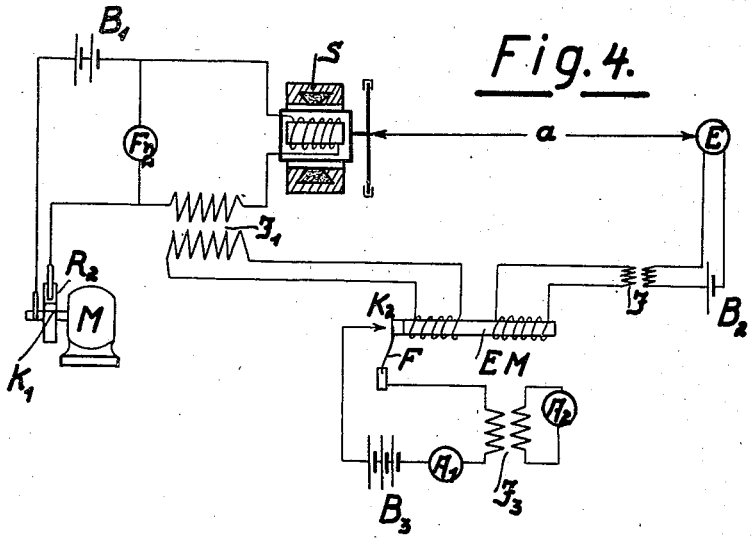
Fig. 4 shows a device by means of which sound impulses are emitted in continuous succession, the permanent action of which upon a measuring circuit is determined.

Fig. 4 shows a device in which the sound impulses are transmitted at regular intervals. The motor M rotates a contact disk $R_2$ with the contact $K_1$ and closes the transmitter circuit once at each revolution. At each switching in a current impulse is made to act through the induction coil $J_1$ upon the electromagnet EM which consequently releases the spring F and closes the contact $K_2$ of the measuring circuit. When the sound arrives at E the magnet EM is strengthened by induction impulse so that it attracts again the spring F and thus opens again the contact $K_2$. The same operation repeats itself. Suppose the motor executed ten revolutions per second which are indicated by the frequency of meter $F_2$ and the time which the sound requires to travel through the distance $a$ be one hundredth of a second, the indicating instrument A will therefore be switched in each time during 1/100 of a second and switched out during 9/100 of a second, wherefrom result the conditions illustrated in Fig. 5. The hatched surfaces represent the quantities of current which flow through $A_1$.

Figure 5:
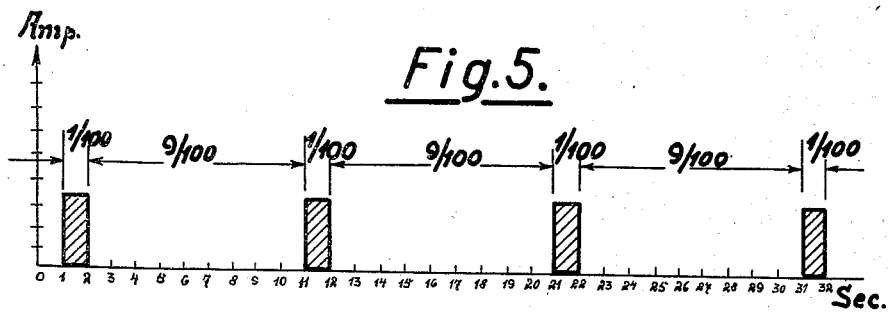
Figs. 5 and 6 show diagrammatical illustrations of the quantities of current which act in a device as shown in Fig. 4 upon the indication device through measuring distances of different lengths.
Figure 6:
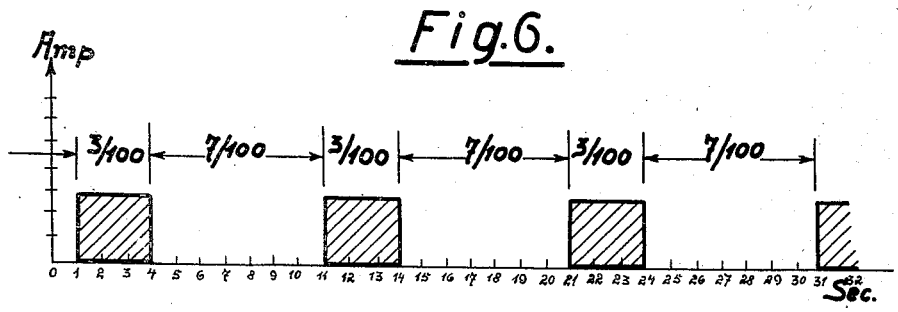

In Fig. 6 a case is illustrated in which the sound requires 3/100 sec. for travelling through the distance $a$, the intervals being therefore 7/100 sec. In the case of Fig. 5 an amperemeter or other measuring instrument will adjust itself to a smaller average value than in the case of Fig. 6. The actual deflection of the instrument is a measure for the time during which current flows e. g. for the distance $a$.

It is evident that my invention may be otherwise embodied, suitable circuits, instruments and connections being used according as direct or alternating current is used.

With devices as shown in Fig. 4 one could proceed also in such a manner that normally the current is switched in in the measuring circuit and that it is switched off only during the time which the sound requires for travelling through $a$.

The figures are evidently only diagrammatic forms of construction given by way of example without exhausting all possible combinations.

The range of application of the invention is very manysided. It is of value in all cases where distances have to be measured of which only the beginning and the end are accessible. The invention specially facilitates the measuring and renders the same easy and it permits further the continuous finding out of the depth of the sea from a travelling ship. The apparatus having been switched in the actual depth can be read at any moment on the indicating instrument.

I claim:—

1. A method for measuring distance with the aid of sound waves which consists in creating a succession of electrical impulses at regular known intervals at the beginning of the distance to be measured and converting such electrical impulse into a compressional wave impulse and energizing an electric measuring instrument of the type capable of giving an instantaneous indication of an average current flowing simultaneously therewith, receiving said compressional wave impulse at the end of the distance to be measured, converting said compressional wave impulses into an electric impulse and simultaneously de-energizing said electric measuring instrument.

2. In a method of measuring distances with the aid of sound waves, creating electrical impulses at regular known time intervals and transforming them into compressional impulses at the beginning of the distance to be measured, simultaneously energizing a measuring electric circuit including electrical means for giving an instantaneous indication of the average current flowing and causing said compressional impulses to be converted into electrical impulses on their receipt at the end of the distance to be measured, and simultaneously de-energizing the said electrical means thereby whereby the time of travel of said sound waves may be noted and the distance traveled may be ascertained by measuring the current traveling through said measuring circuit including said electrical means.

3. In a method for measuring distances with the aid of sound waves, the closing of an electric circuit at regular known time intervals at the beginning of the distance to be measured, whereby electrical impulses will be originated, and causing said electric impulses to be converted into compressional wave impulses, and simultaneously energizing a measuring circuit, including an electrical means for giving an instantaneous indication of the average current flowing, and causing the receipt of said sound waves at the end of the distance to be measured to energize a second electric circuit and to de-energize the said means, and measuring the current passing through the meter between the emission and receipt of said sound waves, whereby the distance to be measured may be determined by the amount of current traveling through the said means between the times of emission and receipt of said sound waves.

4. In a method for measuring distances with the aid of sound waves, the creating of electric impulses at regular known time intervals and translating them into compressional waves at the beginning of the distance to be measured and simultaneously energizing a measuring electric circuit including electrical means capable of giving an instantaneous indication of the average current flowing and causing said sound waves to be translated at the end of said distance into electric impulses and simultaneously de-energizing said means whereby the value of the current indicated by the meter may be utilized to determine the distance to be measured.

5. A method for measuring distance with the aid of sound waves consisting in the creation of electrical impulses at regular known time intervals and converting said electrical impulses into compressional wave impulses and simultaneously closing a measuring circuit including electrical means capable of giving an instantaneous indication of the average current flowing, receiving said compressional wave impulses at the end of the distance to be measured and simultaneously opening said measuring circuit and measuring the value of the current flowing through said measuring circuit by means of said electrical means, whereby the distance to be measured may be calculated.

In testimony whereof I affix my signature.

WILLY KUNZE.